US012688865B2

(12) United States Patent
Erden et al.

(10) Patent No.: US 12,688,865 B2
(45) Date of Patent: Jul. 21, 2026

(54) STAGGERED BITS MAGNETIC RECORDING

(71) Applicant: Seagate Technology LLC, Fremont, MN (US)

(72) Inventors: Mehmet Fatih Erden, St. Louis Park, MN (US); Steven Douglas Granz, Shakopee, MN (US); Cheng-Ming Godbey Chow, Eden Prairie, MN (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 19/050,698

(22) Filed: Feb. 11, 2025

(65) Prior Publication Data

US 2025/0259647 A1 Aug. 14, 2025

Related U.S. Application Data

(60) Provisional application No. 63/552,808, filed on Feb. 13, 2024.

(51) Int. Cl.
| | |
|---|---|
| *G11B 5/02* | (2006.01) |
| *G11B 5/09* | (2006.01) |
| *G11B 20/12* | (2006.01) |

(52) U.S. Cl.
CPC .................. *G11B 5/02* (2013.01); *G11B 5/09* (2013.01); *G11B 20/1217* (2013.01); *G11B 2020/1238* (2013.01)

(58) Field of Classification Search
None
See application file for complete search history.

(56) References Cited

U.S. PATENT DOCUMENTS

| | | | | |
|---|---|---|---|---|
| 6,331,364 B1* | 12/2001 | Baglin | ..................... | G11B 5/82 428/836 |
| 7,982,994 B1 | 7/2011 | Erden et al. | | |
| 8,035,910 B2 | 10/2011 | Mallary et al. | | |
| 8,711,517 B2 | 4/2014 | Erden et al. | | |
| 8,786,970 B2 | 7/2014 | Erden et al. | | |
| 8,922,923 B2 | 12/2014 | Steiner et al. | | |
| 9,275,675 B2 | 3/2016 | Erden et al. | | |
| 9,570,104 B1 | 2/2017 | Erden et al. | | |
| 9,666,213 B1 | 5/2017 | Erden et al. | | |
| 9,728,223 B2 | 8/2017 | Erden et al. | | |
| 9,928,861 B1 | 3/2018 | Erden et al. | | |
| 10,002,625 B1 | 6/2018 | Erden | | |
| 10,255,945 B1 | 4/2019 | Erden et al. | | |
| 10,366,726 B1 | 7/2019 | Granz et al. | | |

(Continued)

*Primary Examiner* — Peter Vincent Agustin
(74) *Attorney, Agent, or Firm* — Mueting Raasch Group

(57) ABSTRACT

Described are systems, devices and methods for staggered bits magnetic recording. A staggered bits track pattern is recorded on granular magnetic recording media, thereby mapping a data bit sequence onto adjacent tracks so that the bits in one track are staggered relative to the bits in the adjacent track. A read head having an effective cross-track width extending across the tracks is aligned to read a sequence of combined bit signals as the read head is advanced in the down-track direction. Each combined bit signal combines one bit from each adjacent track. A data channel coupled to the read head is used to disambiguate the sequence of combined bit signals, thereby reproducing the data bit sequence.

20 Claims, 8 Drawing Sheets

(56) References Cited

U.S. PATENT DOCUMENTS

| | | | |
|---|---|---|---|
| 2002/0132083 A1* | 9/2002 | Weller | G11B 5/746 |
| 2007/0258161 A1* | 11/2007 | Richter | G11B 5/855 |
| 2008/0094742 A1* | 4/2008 | Albrecht | G11B 5/743 |
| | | | 360/48 |
| 2009/0067090 A1* | 3/2009 | Ling | G11B 5/743 |
| | | | 360/135 |
| 2010/0149934 A1* | 6/2010 | Ross | G11B 7/013 |
| | | | 369/47.5 |
| 2011/0170391 A1* | 7/2011 | Ross | G11B 7/131 |
| | | | 369/53.26 |
| 2013/0083416 A1* | 4/2013 | Kasiraj | G11B 5/012 |
| | | | 360/39 |
| 2015/0009787 A1* | 1/2015 | Rausch | G11B 5/09 |
| | | | 369/13.26 |
| 2024/0005952 A1* | 1/2024 | Mendonsa | G11B 5/4826 |
| 2025/0259647 A1* | 8/2025 | Erden | G11B 5/012 |

* cited by examiner

STAGGERED BITS MAGNETIC RECORDING

CROSS REFERENCE TO RELATED APPLICATIONS

The present application claims the benefit under 35 U.S.C. § 119(e) of U.S. Provisional Patent Application 63/552,808, filed on Feb. 13, 2024, which is hereby incorporated by reference in its entirety.

TECHNICAL FIELD

The disclosure relates to magnetic recording techniques particularly for use in hard disk drives that utilize granular magnetic recording media.

SUMMARY

In accordance with certain aspects, the present disclosure describes systems, devices and methods for staggered bits magnetic recording. This includes granular magnetic recording media having a staggered bits track pattern that maps a data bit sequence onto a first track and a second track that are co-adjacent in a cross-track direction, the first track having a first series of bits distributed evenly along a down-track direction, and the second track having a second series of bits distributed evenly along the down-track direction in manner that is a staggered relative to the first series of bits. A read head having an effective cross-track width extending across the first track and the second track is aligned to read a sequence of combined bit signals as the read head is advanced relative to the first track and the second track in the down-track direction. Each combined bit signal combines one bit from the first track and one bit from the second track. A data channel coupled to the read head is used to disambiguate the sequence of combined bit signals, thereby reproducing the data bit sequence.

In certain aspects, the bits are recorded according to a conventional magnetic recording (CMR) scheme, a shingled magnetic recording (SMR) scheme, or an interlaced magnetic recording (IMR) scheme. In certain aspects, the bits are recorded according to a two-dimensional magnetic recording (TDMR) scheme.

In certain aspects, the staggered bits track pattern includes a third track of bits that are staggered relative to both the first series of bits and the second series of bits. In certain aspects, the effective cross-track width of the read head further extends across the third track such that each combined bit signal combines one bit from the first track, one bit from the second track, and one bit from the third track.

In certain aspects, the read head includes more than one reader.

In certain aspects, the bits have aspect ratios less than 4:1, for example about 1:1. The aspect ratio of bits on adjacent tracks may be the same or different.

In accordance with various embodiments, the present disclosure provides a method for reading a staggered bits data pattern, which includes aligning a read transducer across multiple adjacent tracks of bits on a granular recording media, the bits on the adjacent tracks forming a staggered bits pattern that stores a data bit sequence. As the read transducer is advanced along the multiple adjacent tracks, a sequence of combined bit signals is detected, each combined bit signal combining one bit from each of the multiple adjacent tracks. The sequence of combined bit signals is decoded to thereby reproduce the data bit sequence.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

Figure 1:
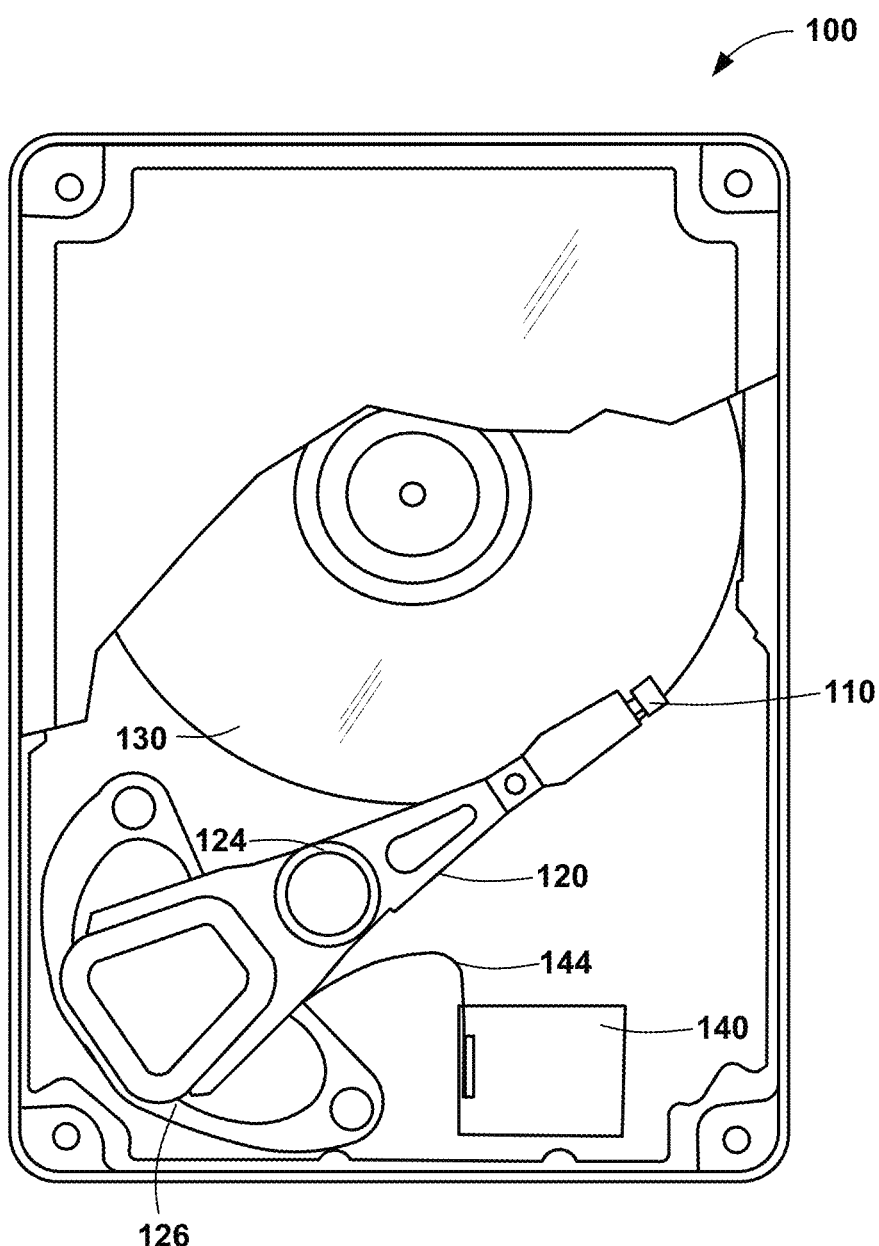
FIG. 1 is a schematic representation of a hard disk drive as may be used with various aspects of the present disclosure.

The present disclosure relates to the use of a staggered bits recording pattern in which the data bits on adjacent tracks are staggered in such a way that a single read head detects a combined signal from a data bit on the first track and a data bit on the second track. As the tracks are advanced under the read head, a sequence of combined bit signals is thereby generated. Using the sequence of combined bit signals generated by a single pass of a single read head, the original data bit values can be produced. Such a staged bits recording pattern allows single read head configurations to be used to read multiple bit tracks simultaneously and without ambiguity. Staggered bits recording patterns also allow for the recording of data bits having a bit aspect ratio close to 1:1 while maintaining, or even improving, areal density capability (ADC).

In a conventional hard disk drive (HDD) storage system, the HDD receives a data file to be stored, divides the data file into pieces called sectors, encodes each sector, and writes the encoded sectors onto magnetic storage medium using a write head. To retrieve the data file, a read head (also referred to herein in terms of its functional component, which is a read transducer, or simply a reader) reads the sectors as a set of signals that are sent through detector and decoder blocks that reconstitutes the file in a format suitable for the host or user. The data bits that constitute the sectors are written onto tracks defined on the magnetic media surface. By convention, the aspect ratio of a data bit (bit aspect ratio, or BAR) is defined by the width of the tracks (measured in the cross-track direction) divided by the length of the data bit (measured in the down-track direction). Increasing the storage capacity involves squeezing more data bits into the same area on the magnetic media, which can be accomplished by increasing the number of tracks per inch, or TPI (thus decreasing the track width), and/or by increasing the bits per inch, or BPI (thus decreasing the bit length). The overall areal density capability (ADC) is thus equal to TPIxBPI.

For a given reader design with fixed read head width, the track width cannot be conventionally reduced without introducing intertrack interference (ITI). In other words, track widths narrower than the effective read head width will result in the read head picking up signal from adjacent tracks. ITI is considered noise that must be filtered out, usually at the cost of additional data channel processing overhead, more complicated data channel architectures, the loss of data level resolution, and/or the use of one or more additional read heads or multiple passes by the same read head. As such, in conventional data bit layouts, the read head width dictates the track width. Thus, the only degree of freedom for increasing ADC is decreasing the bit length without decreasing the track width. This necessarily increases the BAR. However, for granular magnetic recording media, the bit length can only be reduced so far until being limited by the average grain size of the media. Bit lengths that approach the average grain size can lead to unstable data bits when attempting to write and retain data, and to greatly increased noise when attempting to read data.

Staggered bits magnetic recording in accordance with various aspects of the present disclosure can be used to reduce track widths below the read head width and to thereby reduce bit aspect ratios while retaining data level resolution and preserving or increasing areal density capability, all without the necessity of introducing the complications of intertrack interference or multiple readers. By staggering bits on adjacent tracks, bits from both tracks can be simultaneously sampled by the read head without losing any information because the next pair of bits that are sampled will include one of the bits from the previous sample. As will be set forth in more detail in the discussion that follows, this allows each data bit to be unambiguously resolved.

As mentioned, staggered bits magnetic recording in accordance with various aspects of the present disclosure allows for a single reader, single pass architecture despite reading multiple tracks simultaneously. This has advantages over dual (or more) reader architectures, which introduce skew problems when used with rotating magnetic media. It also has performance advantages since multiple passes over the same tracks are not necessary, and since conventional read channel architectures can be used. Of course, multiple reader architectures can still be utilized when it is advantageous to do so. For example, in two-dimensional magnetic recording (TDMR), it may be useful to employ more than one reader.

Staggered bits recording patterns can be written onto granular magnetic media using any desired recording scheme, whether random or sequential, and whether via conventional magnetic recording (CMR), shingled magnetic recording (SMR), or interlaced magnetic recording (IMR) schemes. In SMR, tracks are written in a way that overlays a portion of a previously written adjacent track, reminiscent of installing shingles on a roof. In this way, the tracks are recorded as easy-to-write wide tracks, and the act of writing the next track partially over-writes the previous track, reducing the effective track width. This is a method for increasing the track density, and therefore increasing the overall ADC. The final track written in a shingled striping scheme remains wide and is often referred to as the fat track. SMR necessitates arranging the data bits in a way that facilitates sequential writing. In CMR, data can be written randomly or sequentially. When recording in a staggered bits pattern using SMR, a series of data bits can be written across two adjacent and staggered tracks in a zig-zag pattern such that each alternating data bit is written to an alternating one of the tracks.

While CMR, SMR or IMR schemes may be readily employed for recording patterns of staggered bits in accordance with the present disclosure, the process of reading back the data recorded under each scheme may be different. For example, recording using CMR will likely result in adjacent staggered tracks having independent data bit sequences, and thus the reproduced data bit sequences are divided into separate tracks. Recording using SMR can be done in a way that produces a single sequence of data bits that zig-zags back and forth across both tracks. As such, the simultaneous reading of both tracks can reproduce the data bits as a single sequence.

In CMR recording schemes, the reader reads two adjacent tracks, although the goal is to recover one of those. The signal produced by the reader reading the two adjacent tracks is transmitted to the read-channel architecture, which processes both tracks to detect the independently coded sectors in those tracks. The sectors detected from the track of interest is then sent to the channel code to recover the user data. In this process, the channel detector utilizes the information from the adjacent track to detect the information on the track of interest, thereby producing detector gains. In SMR recording schemes, a sector can be encoded and then split onto two adjacent tracks (unlike in CMR where each track is independently encoded), or sectors on both tracks can be jointly encoded. Thus, SMR can also produce a code gain in addition to a detector gain.

Moreover, staggered bits recording has a built-in reader alignment capability. When the center of the reader moves slightly away from a centerline position between two adjacent staggered bits tracks, the read signal amplitudes developed from the combined bit signals may vary from an expected amplitude by enough that the reader position relative to the two adjacent tracks can be obtained. This information leads to better positioning of the reader on the fly.

Recording based on staggering the bits at adjacent tracks relies on writing narrower tracks with wider bit lengths so that the read head can read multiple tracks, thus combining the bits on adjacent tracks into a single sequence of combined bit signals that can be decoded to unambiguously reproduce the sequence of recorded bits. This can be accomplished using a single reader and single data channel without the need to handle the adjacent track information differently, such as with multi-level recording, due to the fact that the information sampled on adjacent tracks constitutes parts of a combined signal. Moreover, because narrower tracks are being written with wider bit lengths, the bit aspect ratio (BAR) can be made much smaller at the same ADC, even to the point of the BAR approaching 1:1.

Reference will now be made to the drawings, which depict one or more aspects described in this disclosure. However, it will be understood that other aspects not depicted in the drawings fall within the scope of this disclosure. Like numbers used in the figures refer to like components, steps, and the like. However, it will be understood that the use of a reference character to refer to an element in a given figure is not intended to limit the element in another figure labeled with the same reference character. In addition, the use of different reference characters to refer to elements in different figures is not intended to indicate that the differently referenced elements cannot be the same or similar. It will also be appreciated that the drawings are meant to illustrate certain aspects and arrangements of features in a way that contributes to their understanding and are not meant to be scale drawings that accurately represent size or shape of elements. Likewise, the use of charts is meant to elucidate selected physical and optical behaviors without being bound to exactitude or to any theory.

FIG. 1 schematically depicts a typical HDD device 100 that includes a read/write head 110 disposed on the end of an actuator arm 120 that is rotationally movable around a pivot 124 by use of a voice coil motor 126. The read/write head 110 is positioned in close proximity to the surface of magnetic media disk 130 such that the read/write head can write data bits to and read data bits from tracks on the magnetic media 130 as it spins by action of a spindle motor (not shown). HDD device 100 can operate on any magnetic recording principle, whether that be conventional magnetic recording (CMR), shingled magnetic recording (SMR), heat-assisted magnetic recording (HAMR), or any other type of recording technique and combinations thereof. While the actuator 120 is shown to move rotationally, the present disclosure is not limited to how the actuator moves and encompasses linear actuation. Likewise, recording heads like read/write head 110 can be provided on movable or stationary rails, or in any other suitable manner now know or later contemplated.

In accordance with the present disclosure, magnetic media 130 is granular magnetic media, meaning that the magnetic recording layer is characterized by a random distribution of somewhat closely packed crystalline and poly-crystalline grains of material, often of roughly similar size. The average grain size is typically expressed in nanometers as the diameter of a circle that would roughly cover the grain, and for example may be less than 10 nm. In current HAMR devices, the average magnetic media grain size can be about 6 nm. The grains of the magnetic recording layer may be composed of any suitable material, for example an iron-platinum alloy (FePt) or other alloys such as NdFeB or various cobalt-based alloys that may include nickel, chromium, phosphorous, and/or other materials. It will be appreciated that various aspects of the present disclosure can be realized utilizing different media materials and grain structure characteristics including grain size and shape, grain distribution and packing density, grain property anisotropy, and so forth. It will be appreciated that staggered bits recording can be utilized with media that exhibits a highly random grain structure as well as a more ordered grain structure, as well as with patterned media. When using staggered bits recording with ordered or patterned media, the bits staggering may be incorporated within the design of the media, for example by staggering the grain locations in bit patterned media as desired at each media zone.

Figure 2:
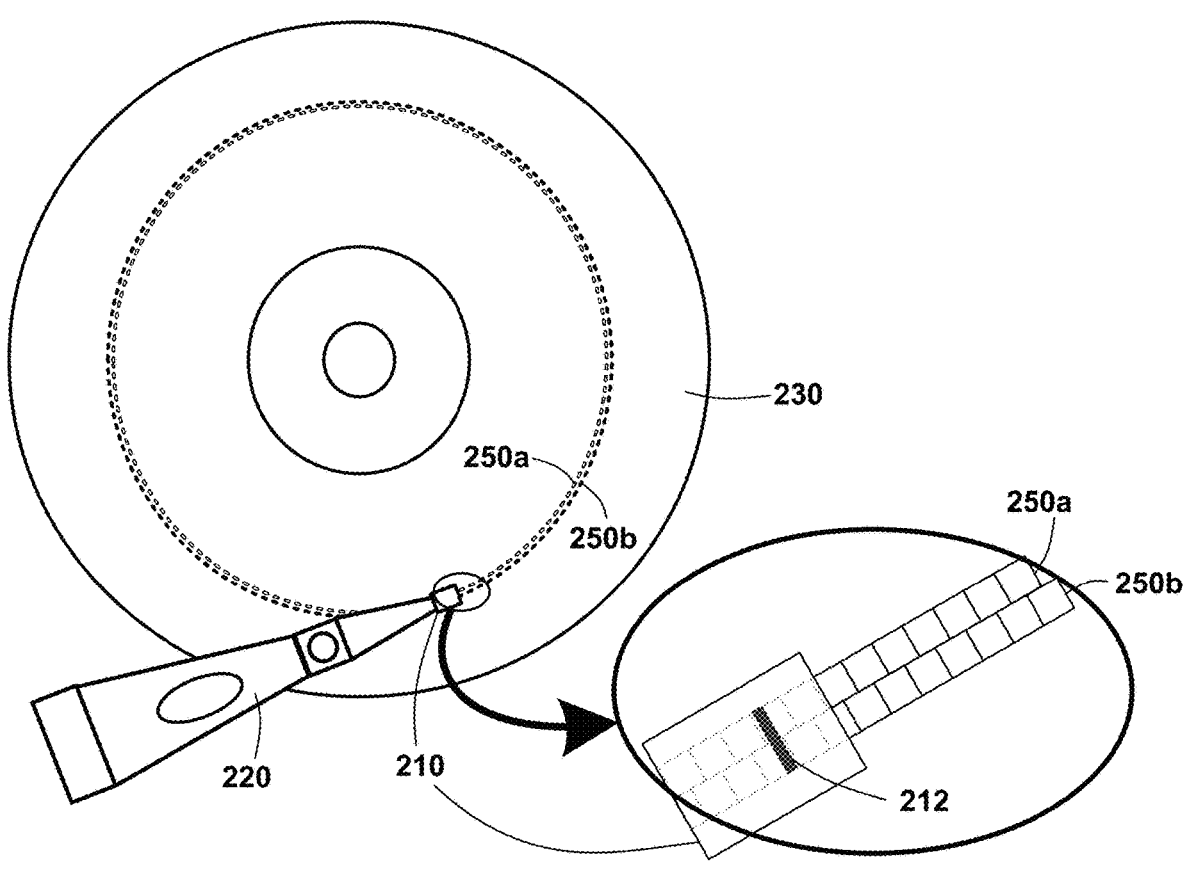
FIG. 2 is a schematic representation of tracks having a staggered bits pattern and recorded on rotating magnetic media in accordance with certain aspects of the present disclosure.

FIG. 2 schematically depicts reading data bits recorded on rotating magnetic media 230 in a staggered bits format in accordance with aspects of the present disclosure. The manner in which the elements in FIG. 2 are depicted is for illustrative purposes, and not meant to indicate relative size, shape, scale, etc. FIG. 2 shows two adjacent tracks of data bits, track 250a and track 250b, over which a read head 210 is positioned, for example by the aid of actuator arm 220 on the end of which read head 210 is disposed. The area at and around the read head is magnified in the inset of FIG. 2, showing that a reader 212 on the read head 210 is aligned so that it spans both tracks 250a and 250b.

As seen in the inset, track 250a and track 250b have data bits distributed such that the data bits on one track start and end near the middle of the data bits on the adjacent track. Such a distribution of data bits on adjacent tracks is exemplary of what the present disclosure calls a staggered bits track pattern, a staggered bits pattern, or a staggered bits format. As can further be seen in the inset, the staggered bits format allowed the reader 212 to sample a combined bit signal that combines a single data bit from track 250a and a single data bit from track 250b. As the magnetic disk 230 is rotated so that the reader 212 advances in the down-track direction, the next combined bit signal that is sampled combines the same single data bit that was just sampled from one of the tracks with a new single data bit from the other track. Thus, each subsequent combined bit signal combines previous data bit information with new data bit information. This allows the sequence of combined bit signals to be decoded, or disambiguated, to thereby produce a sequence of data bits that matches the data bits recorded onto data tracks 250a and 250b.

Figure 3:
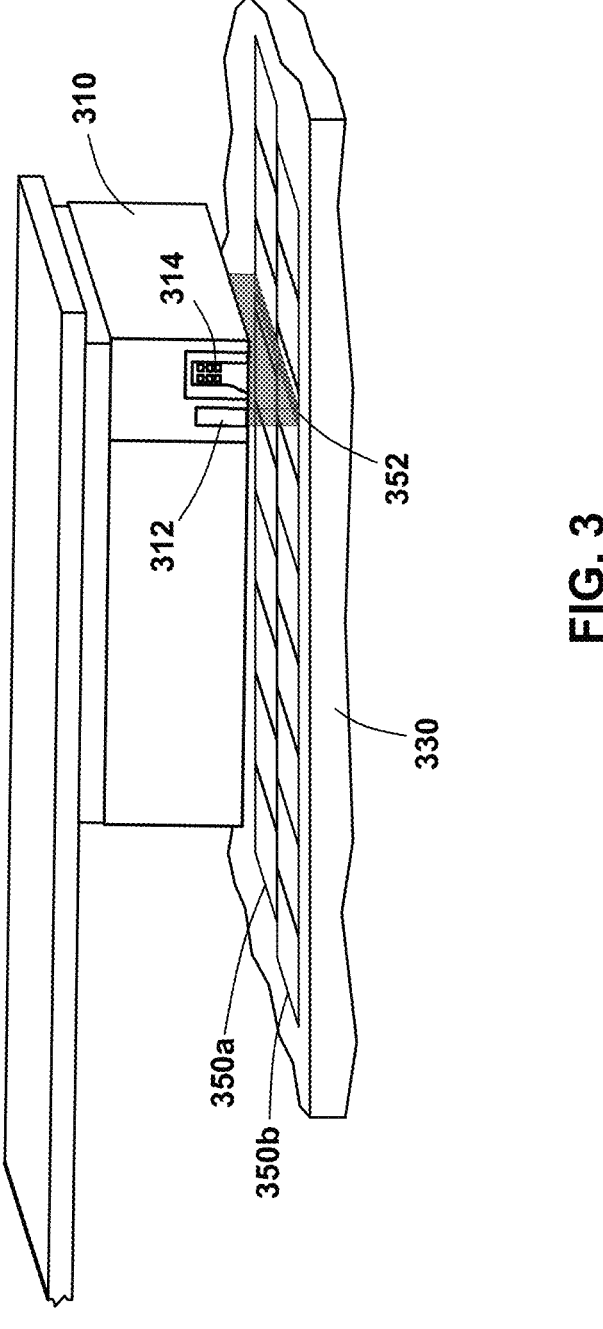
FIG. 3 is a schematic representation of a read/write head that may be used to write and read staggered bits track patterns in accordance with certain aspects of the present disclosure.

FIG. 3 schematically depicts a perspective view of a reader 312 reading combined bit signals from adjacent tracks 350a and 350b that form a staggered bits pattern on magnetic recording media 330. Again, FIG. 3 is meant to be illustrative and not indicative of actual or relative size, shape, and dimension. Read/write head 310 is included as part of a slider that is suspended on the end of an actuator arm, with read/write head 310 including a reader 312 and a writer 314. The relative position and placement of reader and writer elements in a recording head can be different than that shown in FIG. 3 depending on the application. In certain embodiments, writer 314 can be a HAMR writer that includes a write pole along with a laser and waveguide used to direct light to a near-field transducer to generate plasmons that are focused onto the magnetic recording medium to thereby locally reduce the coercivity of the recording medium to aid in the recording of bits.

In FIG. 3, a shaded box 352 indicates the area under the reader 312, thus schematically illustrating that the reader width extends across both tracks 350a and 350b while being narrow enough to read the combination of a single data bit from track 350a and a single data bit from track 350b. In accordance with various aspects of the present disclosure, a single reader 312 is used to read a sequence of combined bit signals, each combined bit signal in the sequence combining a single data bit from track 350a and a single data bit from track 350b, and in such a way that each sequential combined bit signal combines one of the data bits from the previous combined bit signal with a new data bit.

Figure 4:
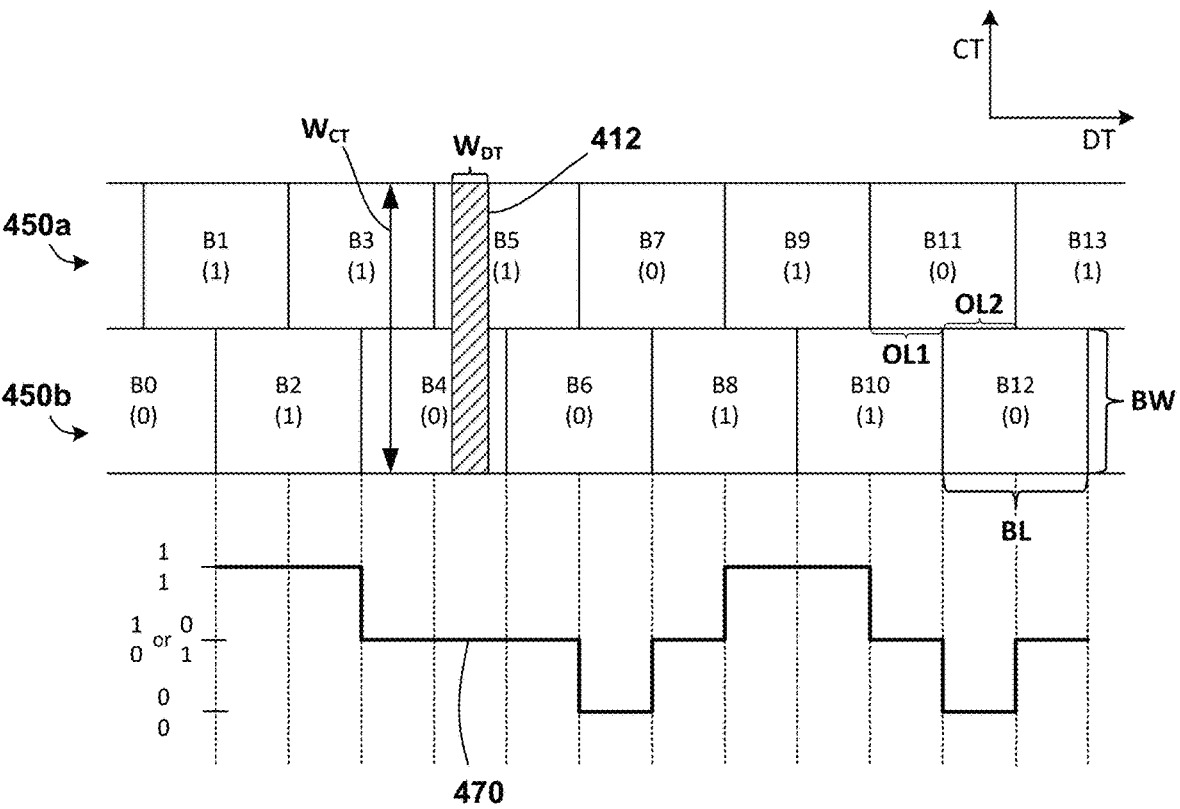
FIG. 4 is a schematic representation of a staggered data bits pattern and a resulting combined bit signal amplitude in accordance with aspects of the present disclosure.

FIG. 4 schematically illustrates how a staggered bits pattern may be read by a read transducer 412 moving relative to magnetic media having a staggered bits pattern of data bits recorded thereon. As shown, a sequence of bits B0 through B13 is arranged in a staggered pattern on two adjacent tracks, track 450a and track 450b. Thus, the sequence of data bits forms a zig-zag, or serpentine, pattern that moves back and forth in the cross-track (CT) direction as it proceeds in the down-track (DT) direction. Numbering the data bits according to this pattern results in track 450a containing the odd numbered data bits (B1, B3, B5, and so forth) and track 450b containing the even numbered data bits (B2, B4, B6, and so forth). For each data bit, FIG. 4 indicates the data bit number (B0 to B13) as well as the data bit value (0) or (1). The data bits are shown to be evenly distributed in the DT direction within a given track. Moreover, the data bits are shown to be substantially the same size, each having a bit length BL measured in the DT direction and a bit width BW measured in the CT direction. The aspect ratio of the data bits is given by BW:BL. For easy of illustration, FIG.

4 shows the bit aspect ratio to be close to 1:1, but any suitable bit aspect ratio can be used.

The read transducer 412 has an effective cross-track width $W_{CT}$ that is sufficient to extend across both tracks 450a and 450b, and preferably $W_{CT}$ is about the same as twice the cross-track bit width BW. This helps ensure that, when properly aligned, the read head reads bit signal contributions that are primarily and substantially limited to the two tracks involved in the staggered bits pattern. The data bits are preferably staggered such that the amount of overlap between the span of a data bit on one track and the span of an adjacent data bit on the adjacent track is sufficient to allow the read transducer 412 to read a combined bit signal that includes a single bit from one track and a single bit from the other track. For example, in FIG. 4 data bit B11 overlaps adjacent data bit B10 by an amount OL1 and overlaps adjacent data bit B12 by an amount OL2. While OL1 and OL2 need not be equal, they are preferably close in value.

FIG. 4 also shows an example of the sequence of combined signal amplitudes 470 detected by read transducer 412 as it is advanced in the down-track direction relative to the storage media. The vertical dashed lines help designate which combined data bits from the staggered bits pattern correspond to each portion of the signal amplitude sequence 470. As indicated, the highest amplitude signal is produced when both contributing data bits are high (11) and the lowest amplitude signal is produced when both contributing data bits are low (00). In between the highest and lowest amplitudes is the ambiguous situation where the contributing data bits could be arranged either as (01) or as (10). However, such ambiguities in the combined bit signal amplitude 470 can be readily resolved when reproducing the data bit sequence without the need for advance channel techniques. Indeed, once any one of the data bits is unambiguously resolved, all the data bits involved in the combined bit signal amplitude 470 can be resolved. For example, because the combined bit signal amplitude from data bits B2 and B3 is high, it is known that data bits B2 and B3 are both of value (1). Thus, when the next combined bit signal amplitude in the sequence is detected at a middle level, data bit B4 can be immediately resolved to be of value (0) since data bit B3 is known to be value (1). There is no ambiguity.

Figure 5:
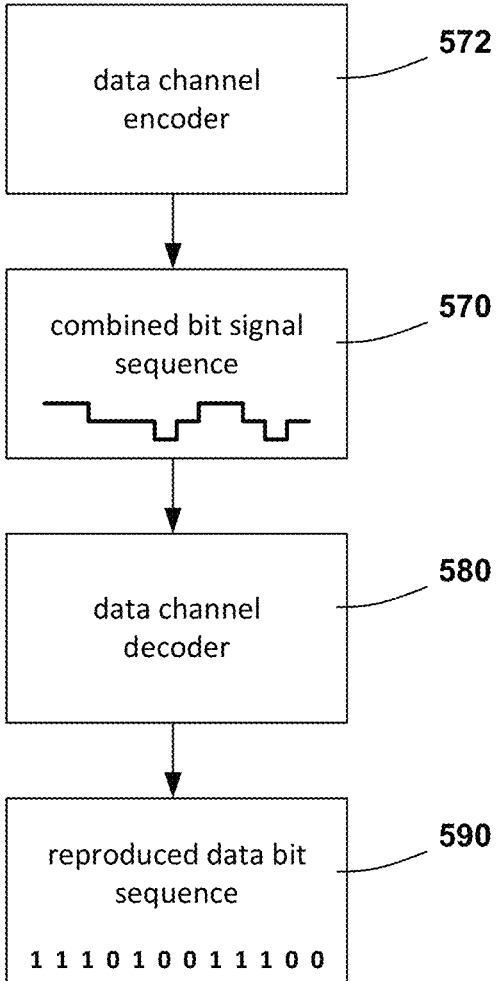
FIG. 5 is a block diagram of a decoding circuit that may be used in accordance with aspects of the present disclosure.

FIG. 5 is a block diagram representing the process of decoding the combined bit signal sequence to reproduce the sequence of data bits that were recorded in a pattern of staggered bits. The combined bit signal sequence 570 as detected by the read transducer and encoded by data channel encoder 572 can in turn be decoded by data channel circuitry 580 in a straightforward and unambiguous manner, as described in reference to FIG. 4, to produce a sequence of data bits 590 that reliably represents the bits recorded in the staggered pattern, subject to sources of noise present in any magnetic recording scheme. Only a single read transducer is required to produce a combined bit signal sequence that is decodable. No special error correction techniques are required while any error correction techniques may be used. Moreover, because the combined bit signal amplitude should fall within well-defined ranges of high, medium, and low amplitudes, detected signals outside the expected ranges may indicate misalignment of the read transducer and can be used to self-correct.

In some decoding schemes, the data bits from both tracks are reproduced together as a sequence of data, for example in the manner discussed in reference to FIG. 4. In some decoding schemes, the data bits from one track may be used to validate the data bits from the other track, with the reproduced data bit sequences being segregated by track.

The choice of decoding scheme may depend on the recording scheme used, for example CMR or SMR.

Figure 6A:
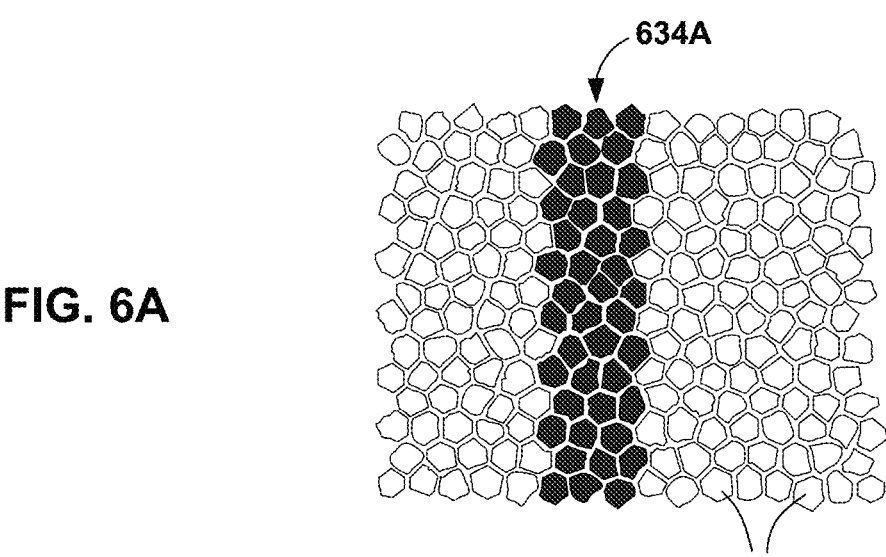
FIG. 6A-C are schematic representations of bits recorded onto granular magnetic storage media.
Figure 6B:
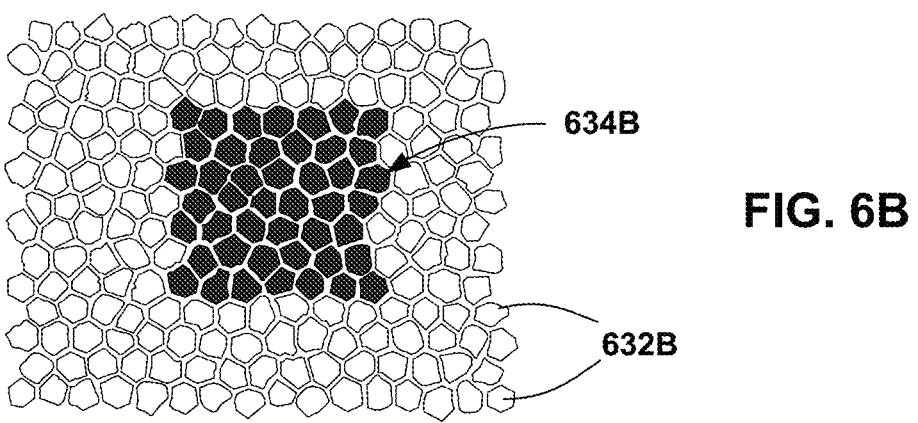
Figure 6C:
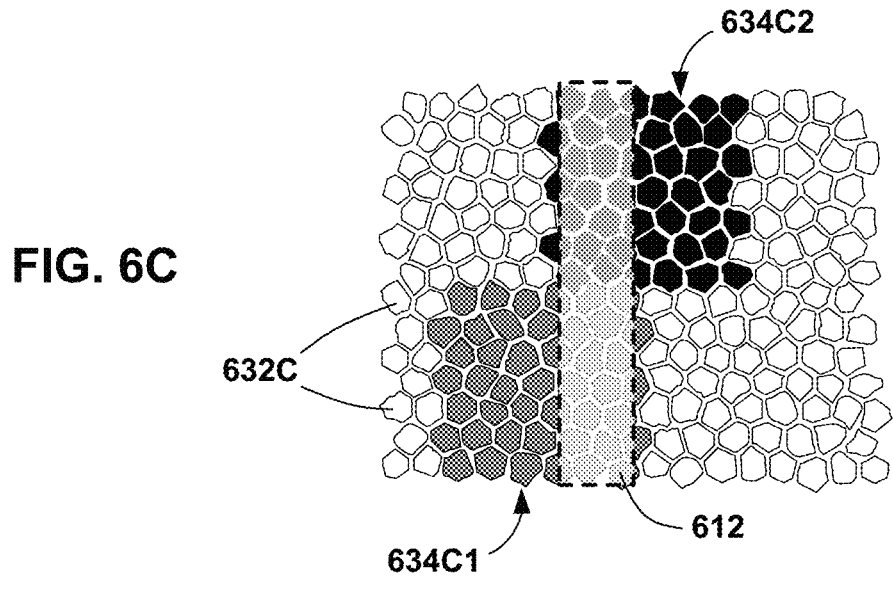

FIGS. 6A-C can be used to compare bits recorded on granular media with different aspect ratios and recording patterns. It should be noted that in practice, the number of grains forming a recorded bit may be very different from what is shown in FIGS. 6A-C for purposes of illustration.

FIG. 6A schematically shows magnetic media grains, such as grains 632A, in a roughly close-packed array. While the grains have irregular edges, they have similar sizes as characterized by an average diameter or center-to-center spacing, for example in the range of about 6 nm to 10 nm. The shaded grains in FIG. 6A represent a recorded bit 634A. As shown, bit 634A has a 4:1 aspect ratio. In current recording techniques, the long dimension of bit 634A is dictated by the effective width of the read transducer in the cross-track direction. Therefore, the only way to increase ADC is to reduce the size of the bit in the down-track direction. In the case illustrated in FIG. 6A, the width of the bit 634A in what would be the down-track direction is three grains. Further reducing the down-track width of the bit 634A could make the bit exceedingly difficult to write in a stable fashion. Moreover, at such narrow bit widths, any further narrowing of the width will greatly increase the noise introduced during reading of the bits.

FIG. 6B shows granular magnetic recording media made up of grains 632B and including a recorded bit 634B having a BAR of about 1:1. The ADC provided by filling granular magnetic media with bits like bit 634B is the same as the ADC provided by filling granular magnetic media with bits like bit 634A because the bits take up the same area. However, since each dimension of bit 634B spans several grains whereas the narrow dimension of bit 634A spans only a few grains, bit 634B is likely more stable. Moreover, there may be room to further shrink bit 634B in either or both directions, thus resulting in an increase in ADC, whereas for bit 634A there is no ability to further shrink the bit size in the narrow dimension. While the bit 634B is shown to include about 40 grains, in practice a recorded bit will likely include many fewer grains, for example about 10 grains or fewer.

FIG. 6C shows granular magnetic recording media made up of grains 632C and including two recorded bits 634C1 and 634C2, each having a BAR of about 1:1. If the vertical direction in FIG. 6C is considered a cross-track direction, then bits 634C1 and 634C2 can be considered to be disposed on adjacent tracks. Bits 634C1 and 634C2 are arranged consistently with a staggered pattern in accordance with the present disclosure. As such, bits 634C1 and 634C2 are configured so that the effective sensing area of a read head can sample the combined contribution from both bits, as illustrated by box 612 representing the span of a read head transducer. Comparing FIG. 6C to FIG. 6A, and assuming the same recording media, the same size read head transducer illustrated in FIG. 6C could be used to read bit 634A. Thus, the reading of reduced BAR staggered bits, such as in FIG. 6C, can take place using the same reader and read channel architecture that is used to read high BAR conventionally arranged bits, such as in FIG. 6A.

Figure 7:
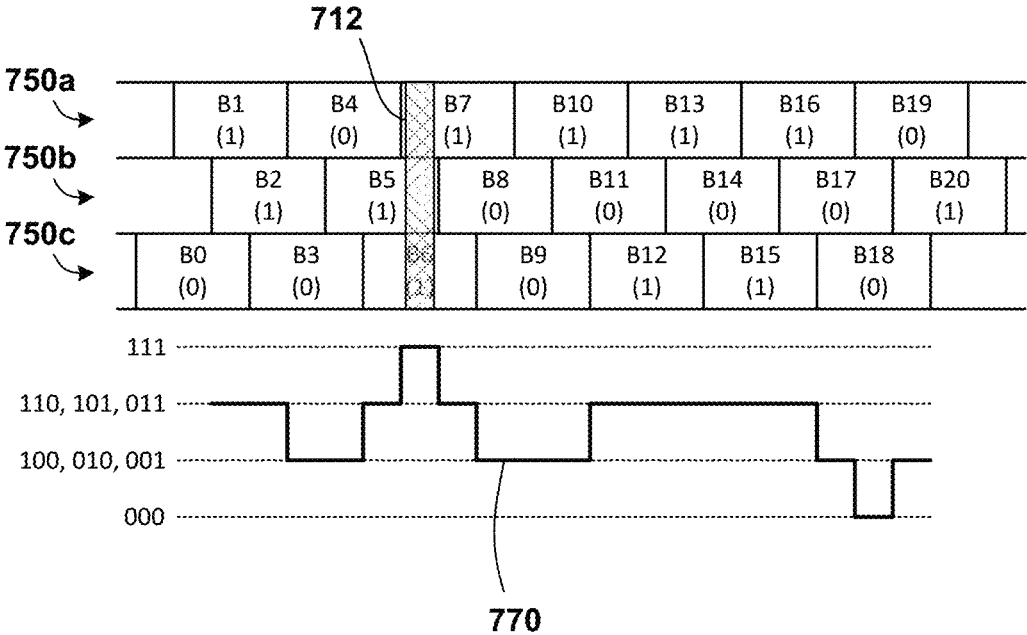
FIG. 7 is a schematic representation of a three track staggered bits pattern along with a resulting combined bit signal amplitude in accordance with aspects of the present disclosure.

For purposes of illustration, staggered bits recording patterns have heretofore been described as encompassing two adjacent tracks. However, it will be appreciated that staggered bits recording in accordance with the present disclosure can be implemented using more than two adjacent tracks. For example, FIG. 7 schematically shows one implementation of a three track staggered bits recording pattern. Tracks 750a, 750b, and 750c are each arranged with bits distributed evenly in the down-track direction in a manner such that the bits on one track are staggered relative to the bits on both of the other tracks. This arrangement allows a reader 712 to sample single bits from each of the tracks, forming a sequence of combined bit signal 770. Due to the additional track, each combined bit signal includes the contribution of three bits, which adds another combined bit signal amplitude level and additional ambiguities. Similar to the two track case, once two bits in a sequence are known, the remaining bit can be determined without ambiguity, provided a sufficient signal-to-noise ratio. In FIG. 7, the bits are labeled B0-B20 with values indicated, along with showing the resulting combined bit signal amplitude 770.

Figure 8:
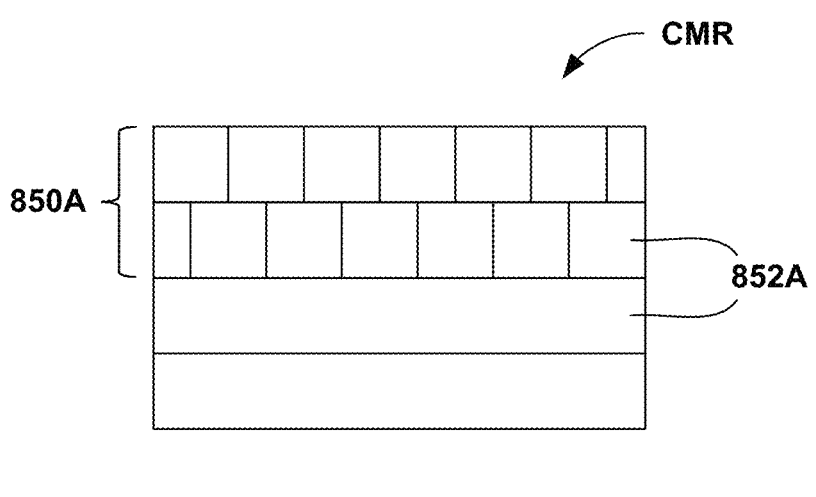
FIG. 8 is a schematic representation of track patterns and staggered bits patterns under different recording schemes.
Figure 8:
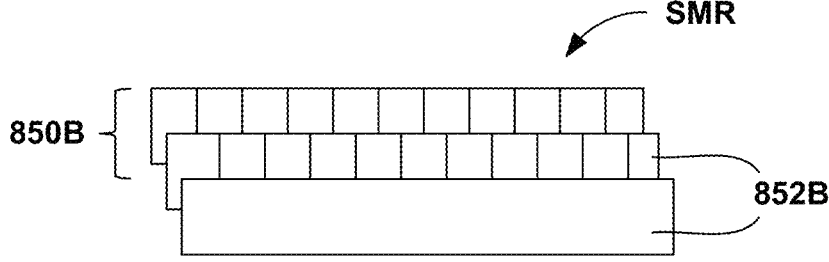
Figure 8:
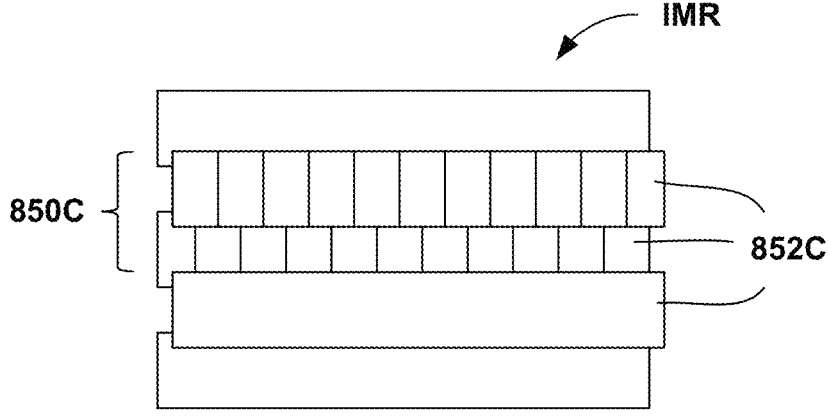

FIG. 8 schematically compares the track patterns and staggered bits arrangements that may be employed in CMR, SMR, and IMR recording schemes. In CMR, adjacent tracks such as 852A are recorded next to each other, sometimes with a small gap between (not shown). A two track staggered bits pattern 850A is shown. In SMR, adjacent tracks such as 852B are recorded such that each subsequent track overlaps the previously recorded track. This allows a higher density of tracks to be written. The resulting two track staggered bits pattern 850B is shown. In IMR, multiple bottom tracks are written separated by gaps, and then top tracks are written in the gaps such that they partially overlap portions of the adjacent bottom tracks. This results in tracks 852C that alternate between wide and narrow. A two track staggered bits pattern 850C involving one wide track and one narrow track is shown.

It should be understood that various aspects disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (e.g., all described acts or events may not be necessary to carry out the techniques). In addition, while certain aspects of this disclosure are described as being performed by a single module or unit for purposes of clarity, it should be understood that the techniques of this disclosure may be performed by a combination of units or modules.

All scientific and technical terms used herein have meanings commonly used in the art unless otherwise specified. The definitions provided herein are to facilitate understanding of certain terms used frequently herein and are not meant to limit the scope of the present disclosure.

As used herein, the term "configured to" may be used interchangeably with the terms "adapted to" or "structured to" unless the content of this disclosure clearly dictates otherwise.

As used herein, the term "or" refers to an inclusive definition, for example, to mean "and/or" unless its context of usage clearly dictates otherwise. The term "and/or" refers to one or all of the listed elements or a combination of at least two of the listed elements.

As used herein, the phrases "at least one of" and "one or more of" followed by a list of elements refers to one or more of any of the elements listed or any combination of one or more of the elements listed.

As used herein, the terms "coupled" or "connected" refer to at least two elements being attached to each other either directly or indirectly. An indirect coupling may include one or more other elements between the at least two elements being attached. Further, in one or more embodiments, one element "on" another element may be directly or indirectly on and may include intermediate components or layers therebetween. Either term may be modified by "operatively" and "operably," which may be used interchangeably, to describe that the coupling or connection is configured to allow the components to interact to carry out described or otherwise known functionality.

As used herein, any term related to position or orientation, such as "proximal," "distal," "end," "outer," "inner," and the like, refers to a relative position and does not limit the absolute orientation of an embodiment unless its context of usage clearly dictates otherwise.

The singular forms "a," "an," and "the" encompass embodiments having plural referents unless its context clearly dictates otherwise.

As used herein, "have," "having," "include," "including," "comprise," "comprising" or the like are used in their open-ended sense, and generally mean "including, but not limited to." It will be understood that "consisting essentially of," "consisting of," and the like are subsumed in "comprising," and the like.

Reference to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout are not necessarily referring to the same embodiment of the disclosure. Furthermore, the particular features, configurations, compositions, or characteristics may be combined in any suitable manner in one or more embodiments.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the disclosure.

What is claimed is:

1. A staggered bits data storage system comprising:

granular magnetic recording media having a staggered bits track pattern that maps a data bit sequence onto a first track and a second track that are co-adjacent in a cross-track direction, the first track having a first series of bits distributed evenly along a down-track direction, and the second track having a second series of bits distributed evenly along the down-track direction in manner that is a staggered relative to the first series of bits;

a read head having an effective cross-track reader width extending across the first track and the second track, the read head aligned to read a sequence of combined bit signals when the read head is advanced relative to the first track and the second track in the down-track direction, each combined bit signal combining one bit from the first track and one bit from the second track; and a data channel coupled to the read head and configured to disambiguate the sequence of combined bit signals to thereby reproduce the data bit sequence.

2. The staggered bits data storage system of claim 1, wherein the bits are recorded according to a conventional magnetic recording (CMR) scheme.

3. The staggered bits data storage system of claim 1, wherein the bits are recorded according to a shingled magnetic recording (SMR) scheme.

4. The staggered bits data storage system of claim 1, wherein the bits are recorded according to an interlaced magnetic recording (IMR) scheme.

5. The staggered bits data storage system of claim 1, wherein the bits are recorded according to a two-dimensional magnetic recording (TDMR) scheme.

6. The staggered bits data storage system of claim 1, wherein the staggered bits track pattern maps the data bit sequence onto the first track, the second track, and a third track that is co-adjacent in the cross-track direction with the second track, the third track having a third series of bits distributed evenly along the down-track direction in a manner that is staggered relative to both the first series of bits and the second series of bits.

7. The staggered bits data storage system of claim 6, wherein the effective cross-track width of the read head further extends across the third track such that each combined bit signal combines one bit from the first track, one bit from the second track, and one bit from the third track.

8. The staggered bits data storage system of claim 1, wherein the read head includes no more than one reader.

9. The staggered bits data storage system of claim 1, wherein the read head includes more than one reader.

10. The staggered bits data storage system of claim 1, wherein the first series of bits and the second series of bits are composed of bits having aspect ratios less than 4:1.

11. The staggered bits data storage system of claim 1, wherein the first series of bits and the second series of bits are composed of bits having aspect ratios of about 1:1.

12. The staggered bits data storage system of claim 1, wherein the first series of bits is composed of bits having a first aspect ratio and the second series of bits is composed of bits having a second aspect ratio that is different from the first aspect ratio.

13. A method for reading a staggered bits data pattern, comprising the steps of:
   aligning a read transducer across multiple adjacent tracks of bits on a granular recording media, the bits on the adjacent tracks forming a staggered bits pattern that stores a data bit sequence;
   advancing the read transducer along the multiple adjacent tracks to thereby read a sequence of combined bit signals, each combined bit signal combining one bit from each of the multiple adjacent tracks;
   decoding the sequence of combined bit signals to thereby reproduce the data bit sequence.

14. The method of claim 13, further comprising adjusting alignment of the read transducer across the multiple adjacent tracks based on one or more combined bit signals.

15. The method of claim 13, wherein the multiple adjacent tracks include no more than two adjacent tracks.

16. The method of claim 13, wherein the multiple adjacent tracks include more than two adjacent tracks.

17. The method of claim 13, wherein the multiple adjacent tracks are recorded according to a conventional magnetic recording (CMR) scheme.

18. The method of claim 13, wherein the multiple adjacent tracks are recorded according to a shingled magnetic recording (SMR) scheme.

19. The method of claim 13, wherein the multiple adjacent tracks are recorded according to an interlaced magnetic recording (IMR) scheme.

20. The method of claim 13, wherein the multiple adjacent tracks are recorded according to a two-dimensional magnetic recording (TDMR) scheme.

\* \* \* \* \*